(12) United States Patent
Granberry

(10) Patent No.: US 12,263,627 B2
(45) Date of Patent: Apr. 1, 2025

(54) SLOPED EDGE ON DECORATIVE ARTICLES WITH A RIGID BASE AND A DECOR THAT IS DIGITALLY PRINTED THEREON

(71) Applicant: Shaw Industries Group, Inc., Dalton, GA (US)

(72) Inventor: Dale Carson Granberry, Chattanooga, TN (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 18/695,149

(22) PCT Filed: Jul. 28, 2023

(86) PCT No.: PCT/US2023/029013
§ 371 (c)(1),
(2) Date: Mar. 25, 2024

(87) PCT Pub. No.: WO2024/026112
PCT Pub. Date: Feb. 1, 2024

(65) Prior Publication Data
US 2024/0335995 A1    Oct. 10, 2024

Related U.S. Application Data

(60) Provisional application No. 63/399,487, filed on Aug. 19, 2022, provisional application No. 63/393,799, filed on Jul. 29, 2022.

(51) Int. Cl.
*B29C 48/00* (2019.01)
*B29C 48/07* (2019.01)
(Continued)

(52) U.S. Cl.
CPC ...... *B29C 48/0022* (2019.02); *B29C 48/0023* (2019.02); *B29C 48/022* (2019.02);
(Continued)

(58) Field of Classification Search
CPC ............ B29C 48/0022; B29C 48/0023; B29C 48/022; B29C 48/07; C08J 5/18;
(Continued)

(56) References Cited

U.S. PATENT DOCUMENTS 9,145,681 B2 * 9/2015 Hannig .................. E04C 2/388
2009/0139170 A1   6/2009 Thiers
(Continued)

FOREIGN PATENT DOCUMENTS

| CN | 1818278 A | 8/2006 |
|---|---|---|
| EP | 3984713 A1 | 4/2022 |

(Continued)

OTHER PUBLICATIONS

Spencer, Discover Stone Polymer Composite Flooring aka SPC Flooring on Suncoast View [online], Nov. 15, 2018, [retrieved on Feb. 22, 2024] URL—https://www.tileoutlets.com/blog/discover-stone-polymer-composite-flooring-aka-spc-flooring-on-suncoast-view/.

(Continued)

*Primary Examiner* — Jeffrey M Wollschlager
(74) *Attorney, Agent, or Firm* — Miller & Martin PLLC

(57) ABSTRACT

A decorative article comprising a base and a top layer disposed thereon. The base may comprise a first surface, a second surface opposite the first, a side surface disposed between the first and second surfaces, and angled surfaces along at least two of the edges of the first surface. The angled surfaces extend from the first surface and towards the second surface. Each angled surface may comprise at least one of a curved portion and a linear portion extending from the (Continued)

curved portion. The base can include a male connector portion extending from one side surface and a female connector portion formed in the opposing side surface, wherein the male and female connector portions are configured to interconnect. The top layer may comprise a decor layer that further comprises a sub layer, an ink layer, and a wear layer disposed above the ink layer.

19 Claims, 8 Drawing Sheets

(51) Int. Cl.
    *B29K 105/06* (2006.01)
    *B29K 309/00* (2006.01)
    *B29L 7/00* (2006.01)
    *E04B 5/43* (2006.01)
    *E04F 15/02* (2006.01)
    *E04F 15/10* (2006.01)

(52) U.S. Cl.
    CPC .............. *B29C 48/07* (2019.02); *E04B 5/43* (2013.01); *E04F 15/02033* (2013.01); *E04F 15/102* (2013.01); *B29K 2105/06* (2013.01); *B29K 2309/14* (2013.01); *B29L 2007/002* (2013.01)

(58) Field of Classification Search
    CPC .............. B29K 2105/06; B29K 230/14; B29K 2309/14; B29L 2007/002; E04B 5/43; E04F 15/02033; E04F 15/102; E04F 15/105
    USPC .................................................. 264/157, 162
    See application file for complete search history.

(56) References Cited

U.S. PATENT DOCUMENTS

| | | | |
|---|---|---|---|
| 2013/0104485 A1* | 5/2013 | Meersseman | B27N 7/00 428/53 |
| 2015/0258845 A1 | 9/2015 | Hannig | |
| 2015/0290968 A1* | 10/2015 | Hannig | B23B 41/00 83/16 |
| 2017/0183878 A1 | 6/2017 | Zhang et al. | |
| 2017/0370110 A1* | 12/2017 | Feys | B32B 37/15 |
| 2018/0274246 A1 | 9/2018 | Vandevoorde | |
| 2020/0208415 A1* | 7/2020 | Feys | E04C 2/20 |
| 2020/0282589 A1* | 9/2020 | Josefsson | B27G 21/00 |
| 2020/0353773 A1 | 11/2020 | Lamproye et al. | |
| 2022/0098876 A1 | 3/2022 | MacPherson | |

FOREIGN PATENT DOCUMENTS

| | | | |
|---|---|---|---|
| WO | 2011138152 A1 | 11/2011 | |
| WO | WO2011138152 | * 11/2011 | |

OTHER PUBLICATIONS

Written Opinion of the International Searching Authority, companion PCT Application No. PCT/US2023/029013, dated Jan. 10, 2024.
International Search Report, companion PCT Application No. PCT/US2023/029013, dated Jan. 10, 2024.

* cited by examiner

SLOPED EDGE ON DECORATIVE ARTICLES WITH A RIGID BASE AND A DECOR THAT IS DIGITALLY PRINTED THEREON

CLAIM OF PRIORITY

The present application is a U.S. National Stage Application under 35 U.S.C. § 371 of PCT International Application No. PCT/US2023/029013, filed Jul. 28, 2023, which claims a benefit of priority to U.S. Provisional Patent Application Ser. No. 63/393,799, filed on Jul. 29, 2022, and also claims a benefit of priority to U.S. Provisional Patent Application Ser. No. 63/399,487, filed on Aug. 19, 2022, both of which are hereby incorporated by reference in their entireties as though fully set forth herein.

TECHNICAL FIELD

The present disclosure generally relates to decorative articles and, more particularly, relates to sloped edges on a decorative articles (e.g., planks) with a rigid base having a décor layer that is digitally applied thereon.

BACKGROUND

Current decorative articles (e.g., planks, tiles, boards, etc.) are generally geometrically shaped (e.g., rectangle, square, etc.) and have outer edges that are either at right angles (i.e., square or flat) or that are sloped (e.g., beveled). The sloped edges of decorative articles can be formed at a wide variety of depths and angles. Decorative articles with said sloped edges can provide easier installations (as the beveled edges can help guide installation and minimize the noticeability of misalignment of adjacent planks) and a sleek and distinct appearance once installed. As such, decorative articles with sloped edges may be desirable.

SUMMARY

The present disclosure provides systems and methods for manufacturing angled edges on decorative articles with a rigid base that has a décor layer which is digitally applied thereon. In one example, the rigid base may be an inorganic material based rigid polymer base such as a stone polymer composite (SPC) base (also interchangeably referred to as stone plastic composite (SPC) base). In one example, the décor layer may be formed by digitally printing directly on a surface of the rigid base. The disclosed embodiments described herein are not limited to only decorative panels with SPC base and may be applied to any appropriate decorative panel with other types of bases that have a décor layer digitally applied to the base without departing from a broader scope of the present disclosure. The other type of bases may include, but are not limited to, a mineral base (e.g., magnesium oxide (MgO)-based core), a wood polymer or wood plastic base, HDF, MDF, or other bases that may come up in the future which are not known currently, etc. The angled edges in the disclosed embodiments advantageously have a "pillow bevel effect" or a "pressed bevel effect" to appear similar to a mechanically pressed bevels that are applied to laminated SPC flooring. In one or more examples, the angled edges that have a pillow bevel or pressed bevel effect may be curved edges (curved shape in cross-sectional view) rather than a straight cut edge (straight line shape in cross-sectional view). The present disclosure also provides decorative articles having sloped edges that may be produced from the methods for manufacturing angled edges on decorative articles as disclosed in the embodiments described herein.

The present disclosure also provides a decorative article comprising at least a base and a top layer disposed on top of the base and extending entirely along the top surface of the base and mirroring the shape thereof. In an embodiment disclosed herein, the base may comprise a first major surface having at least two edges, a second major surface disposed opposite to the first major surface, a side surface disposed between the first and second major surface, and angled surfaces along at least two of the edges of the first major surface. In these disclosed embodiments, each angled surface extends from the first major surface and towards the second major surface such that a first end of each angled surface is at a first level that is in a plane of the first major surface and the opposing end of the angled surface is at the side surface and at a second level that is below the first level and between the plane of the first major surface and a plane of the second major surface. Further, each angled surface may comprise at least one of a curved portion and a linear portion extending from the curved portion. In such embodiments, the base may further comprise a male connector portion extending from at least one side surface and a female connector portion formed at an opposing side surface of the base, the female connector portion comprising a groove defined by an upper lip and a lower lip. In this embodiment, the female connector portion may be configured to receive a corresponding male connector portion of another decorative article to interconnect the decorative article with another decorative article. In some disclosed embodiments, the top layer may comprise a décor layer that further comprises a sub layer disposed on the first major surface and the angled surfaces of the base, an ink layer disposed on the sub layer and forming an image, and a wear layer disposed above the ink layer. The ink layer may be digitally printed thereon, such as by an inkjet printer or by other known printing means.

In accordance with the disclosed embodiments, decorative articles may be formed by extruding a sheet of base material, cutting the sheet of base material into one or more slabs, cooling each slab to a predetermined temperature, such as approximately room temperature, and cutting angled edges into the top surface of the base material before digitally printing a décor layer on the base material and applying a protective wear layer on the décor layer. In some embodiments, after a slab of base material has been cooled to at least the predetermined temperature, one or more pairs of rotating cutters, such as diamond saws, each pair angled to form a V-shape with a small separation between their rotating blades (e.g., saw blades), may be run along the slab's length to form angled edges for adjacent planks along the cut lines. In alternative embodiments, each of the one or more pairs of rotating cutters instead may be implemented using fixed cutting tools, for example having a V-shape or U-shape, such as a chisel or scraper, that similarly cuts edges directly into the top surface of the cooled core material as the cutting blade is moved along the surface. It is noted that the V or U shaped arrangement of the rotating cutters and/or rotating blades as described herein are provided as non-limiting examples. In other example embodiments, the rotating cutters and/or rotating blades may be appropriately shaped and/or arranged to form a contoured edge shape (pillow bevel or pressed bevel effect) without departing from a broader scope of the present disclosure.

After the slab has been fed through a series of saw blades or fixed cutters that are contoured to create the desired angled edge pattern in the finished articles, the slab may be rotated 90 degrees and run through the saw blades or fixed cutters again along its width direction to form an intersecting pattern of angled edges cut into its top surface. In some embodiments, the spacing between the saw blades or fixed cutters may be changed for cutting the angled edges along the slab's width as compared to their spacing used to cut the angled edges along the slab's length. In other disclosed embodiments, different sets of one or more saw blades and/or fixed cutters may be used to cut the angled edges along the length and width of the slab, which also may avoid having to rotate the slab when cutting the intersecting pattern of angled edges into its top surface. In yet other embodiments, where the decorative articles may not be square or rectangular shaped, there may be multiple sets of saw blades or fixed cutters, or alternatively the slab may be rotated multiple times, to have angled edges cut in different directions along its top surface, thereby creating a desired pattern of angled edges. Those skilled in the art will appreciate that various shapes and depths of angled edges may be cut into the cooled base material consistent with the disclosed embodiments.

Preferably the rotating saw blades or fixed cutters in the disclosed embodiments may cut all of the angled edges along both the length and width of the slab to the same desired depth, although there may be alternative embodiments where the depths of the angled edge cuts may be different along the length and width directions. In addition, to minimize waste material, angled edge cuts are also preferably made along each of the outermost edges of the slab, e.g., along both its length and width dimensions. Further, while pairs of diamond-tipped rotating saw blades are preferably used to ensure precision and accuracy when cutting the desired angled edge shape in a single pass over the slab, other types and shapes of saw blades and chisels are also contemplated. The slab of core material in the disclosed embodiments is preferably formed of an extruded SPC base material, but in other embodiments it may comprise one or more of SPC, wood-polymer composite (WPC), laminate vinyl tile (LVT), magnesium oxide, solid wood, engineered wood, or other types of base materials used for creating flooring products. It is noted that extrusion of the base is provided as a non-limiting example method of making the base. In other example embodiments, the base may be made using other methods such as, but not limited to, using a mold.

Further to the disclosed embodiments, after a pattern of angled edges has been cut into the top surface of the slab of base material, a desired décor pattern is digitally printed onto the slab's top surface including the angled edges. In this manner, both the angled edges and the substantially flat areas between the angled edges may be covered with the décor. Next, a protective wear layer may be applied over the digitally-printed top surface of the slab, such as by coating the top surface having the digitally-printed décor with a transparent epoxy or resin layer and then curing such a layer with UV radiation for a predetermined amount of time. Finally, individual decorative articles are cut from the slab by cutting between the adjacent angled edges cut in the slab's top surface.

Advantageously, by digitally printing the décor design only after the bevel cuts have been made in the cooled slab of extruded base material, the digitally printed décor may cover the angled edges as well as the top surface of individual flooring planks, which avoids exposure of any underlying base material due to the formation of the bevels. The disclosed technique for digitally printing the décor design after cutting angled edges into the cooled slab of base material also avoids the conventional problem of warping and deformation that occurs along the angled edges due to thermal movement of the base material as it cools after extrusion. For the same reason, the disclosed embodiments can reduce the amount of material waste that typically stems from warped or deformed angled edges formed by traditional pressed bevel formation techniques. By making the angled edge cuts only after the slab has cooled, and digitally printing the décor over the angled edges and top surface of the slab, the angled edge cuts remain straight (does not warp or move) without ruining the appearance of the décor over the bevels, and therefore provide a pressed bevel effect that otherwise would not be possible using digitally-printed flooring planks.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale. It is to be expressly understood that the drawings are provided for the purpose of examples and description of certain disclosed embodiments only and are not intended as a definition of the limits of the invention as claimed.

DETAILED DESCRIPTION OF DISCLOSED EMBODIMENTS

Figure 1:
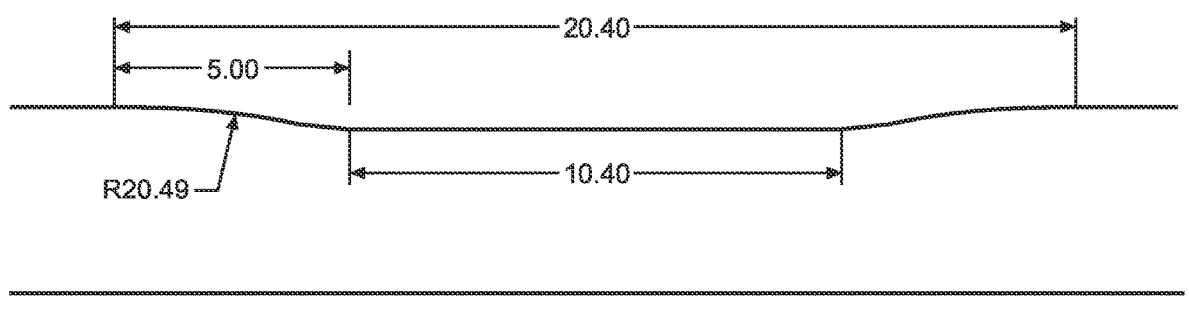
FIG. 1 is a cross section of one exemplary embodiment of a beveled decorative article and includes certain exemplary bevel dimensions.

While the making and using of various embodiments of the present invention are discussed in detail below, it should be appreciated that the present invention provides many applicable inventive concepts that are embodied in a wide variety of contexts. The specific embodiments discussed herein are merely illustrative of specific ways to make and use the present invention and should not limit the scope of the disclosure as defined by any appended claims. Those of ordinary skill in the art will recognize there are numerous equivalents, alternatives, and modifications that may be made to the exemplary disclosed systems and methods described herein and that are still within the scope of the present invention and covered by the claims.

As used herein, the term "angled edge" may refer to a bevel or chamfer formed along one or more edges or along the perimeter of a surface of a decorative article. In one or more examples, the angled edges may be configured such that they have a pillow bevel or pressed bevel effect. That is, the angled edges may have a curved arc shape, or may comprise a combination of one or more curved and linear sections, which provides the appearance of a pressed bevel or pillow like bevel. It is noted that the term "angled edge" may be interchangeably referred to as "sloped edge" in the present disclosure without departing from a broader scope of the present disclosure.

As used herein, the term "decorative article(s)" may refer to a surface covering panel such as, but not limited to, a floor panel (or plank or tiles), a wall panel (or plank or tiles), a ceiling panel (or plank or tile), etc. While the articles are referred to as "decorative" articles, one of skill in the art can understand and appreciate that in addition to the aesthetic aspect, the articles provide functional aspects such as, but not limited to, sub-floor cover, underfoot comfort and warmth, impact resistance, waterproof or water-resistant features, sound attenuation, etc. Hereinafter, the term "decorative article" may be interchangeably referred to as "decorative panels" or "decorative planks" or "decorative articles without departing from a broader scope of the present disclosure. In some examples, hereinafter, the term "decorative article" may be interchangeably referred to as a "flooring plank." However, as mentioned above, it is understood that the decorative article is not limited to flooring, but can include any appropriate surface coverings elements such as wall coverings, ceiling coverings, etc. Further, hereinafter, the term "base" may be interchangeably referred to as "core" or "substrate," without departing from a broader scope of the present disclosure.

Decorative planks are currently available to consumers in many varieties. Often, decorative planks are formed from an engineered composite core material and traditionally comprise a stack of multiple distinct layers that are laminated together. For example, typical decorative planks comprise a solid core layer (single-layer or multi-layer cores), a décor layer, and a protective wear layer stacked on top of each other and then laminated through a heat and pressure process to form the decorative plank. A padding layer is often also added to the bottom of the decorative planks.

The décor layer may be a thin decorative veneer, for example formed from a vinyl or vinyl-like material, having the appearance of wood, stone, or marble. The décor layer provides the visual appearance of the top surface of the decorative planks. The protective wear layer provides a mechanically hard and transparent layer that protects the top surface from scratches, abrasions, wear, and the like. The bottom padding layer may comprise any appropriate material such as cork, rubber, etc., that provides added comfort, acoustic insulation, balance, etc. to the decorative plank.

Angled edges such as pressed bevels are a popular trend in decorative articles (e.g., surface covering articles) today. Currently, to create a pressed bevel on decorative plank, the core-layer material of the decorative plank is extruded into a large sheet and combined with similarly dimensioned sheets of the décor-layer material and the wear-layer material to form the laminated stack described above. The extruded core-layer material is typically hot when it is first extruded and combined with the other layers of the laminated structure. Bevels are mechanically pressed into the top of the stack before it is cut into smaller decorative planks. In particular, the bevels are pressed into the top surface of the laminated stack using mechanical rollers while the extruded core material is still hot. Bevels are typically pressed into the top UV layer material in straight lines along the length and across the width of the sheet. After the laminated sheet has cooled, a cutting tool runs along the seams of adjacent bevels and cuts individual decorative planks from the sheet.

As the extruded core material cools, its change in temperature causes thermal contraction that results in slight movement that changes and distorts the shape of the stacked layers, causing the pressed bevels in the top surface to move distort as well. When the individual decorative planks are then cut out of the extruded sheet material after it has sufficiently cooled, the movement and distortions along the lengths of the pressed bevels of different individual planks often will not align properly when the decorative planks are installed, and such unintended distortions may create an undesirable visual appearance on the installed flooring. This can result in material waste, as those planks having warped and/or deformed bevels are generally thrown out.

Another manufacturing technique for making decorative planks utilizes digital printing in place of using a décor layer. With this technique, a decorative design (or décor) having any desired custom appearance, such as that of wood, stone, marble, tile etc., is digitally printed onto the top surface of the core-layer material after it has been extruded, cooled, and cut into slabs that are properly dimensioned for digital printing. In some examples, the décor layer may be a vinyl sheet with a decorative pattern digitally printed thereon. In said examples, the digitally printed inks have issues adhering to the vinyl sheet. In other examples, the décor layer may be formed using rotogravure printing or similar printing techniques. In said other examples, the development time and time to market is high since large upfront monetary and time investments are needed, decorative patterns may be limited based on the size of the roller causing noticeable repetition of patterns, and texture application and matching with the underlying decor may be more challenging. Direct digital printing onto the core may address one or more of the above issues. For example, digitally printing a décor directly on the surface of the core-layer material enables a wide range of custom-printed flooring planks and allows for a level of customization and creativity previously unavailable. Once digitally printed, the digitally-printed core layer may be laminated with a protective wear layer and cut into individual flooring decorative planks.

Conventional pressed bevels do not work well with such digitally-printed decorative planks because mechanical pressing of the bevels would change the appearance of the digitally-printed décor along the pressed bevels on the SPC planks. Further, pressing bevels into a digitally-printed core-layer material is also undesirable because the formation of pressed bevels is performed soon after the core material has been extruded so that it is still hot and malleable, whereas the digital printing process is preferably performed after the core material is cooled. Further still, pressing bevels into digitally-printed decorative planks while the core material is hot would still result in the conventional problem of deformation and warping along the bevel edges. What is needed are improvements to systems and methods for manufacturing angled edges such as bevels that may be used on digitally-printed decorative planks and other types of similar beveled surface covering articles.

An example of an improved system and method for manufacturing angled edges (e.g., bevels with pressed bevel or pillow bevel effect) on decorative flooring planks with an SPC core that has a décor layer which is digitally applied thereon and overcomes to problems of the prior art is provided herein.

FIG. 1 is a cross section of an exemplary embodiment of a beveled decorative article and illustrates certain exemplary bevel dimensions that may be used in accordance with certain embodiments of the invention. In some example embodiments, the decorative article may be an SPC flooring plank. However, as mentioned above, in other example embodiments, the decorative article may be flooring planks with a rigid core of any other appropriate material such as, but not limited to, a mineral core (MgO based core). In some example embodiments, such as that depicted in FIG. 1, the bevel may comprise an edge portion that may be rounded downwards, towards the bottom surface of the flooring plank, with a desired radius. In the exemplary embodiment of FIG. 1, the radius of the rounded bevel is 20.49 millimeters (mm), though other radius measurements are contemplated depending on aesthetic preferences and tastes. For example, the bevel radius may range from around 1 mm to around 100 mm. In some embodiments, a preferred bevel radius may be between 4 mm and 30 mm depending on the desired visual effect. Through adjusting the angle of the saw blades and/or fixed cutters during the beveling process, the rounded bevel radius can be modified. For example, those desiring a more rounded bevel appearance may adjust the angle of the saw blades and/or fixed cutters so as to create a much smaller rounded bevel radius than FIG. 1 shows. Similarly, those desiring a more subtle rounded bevel appearance may adjust the angle of the saw blades and/or fixed cutters to form a much larger rounded bevel radius. Further, the included angle of the bevel radius may range from about 2 degrees to about 90 degrees, and in some embodiments preferably may be between about 8 to about 53 degrees.

In other alternative embodiments, the bevel instead may comprise a straight (substantially linear) edge that is angled downwards. The angled line segment of the beveled edges may be between 0 degrees and about 45 degrees measured in a manner that is parallel to the plane of the material surface of the flooring plank, e.g., relative to a top surface of the plank. In some embodiments, the beveled edges may be angled approximately 45 degrees downwards towards the bottom surface of the flooring plank. In some embodiments, the angle of the straight bevel line segment preferably may be between about 2 degrees to about 20 degrees.

Figure 7:
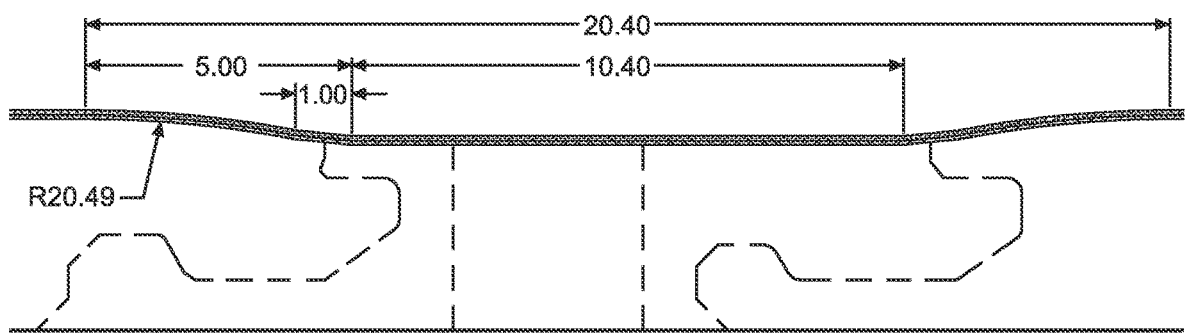
FIG. 7 is a cross section of another exemplary embodiment of a decorative article, including certain exemplary bevel dimensions and the location and shape of certain exemplary male and female connector portions in the base material.
Figure 8:
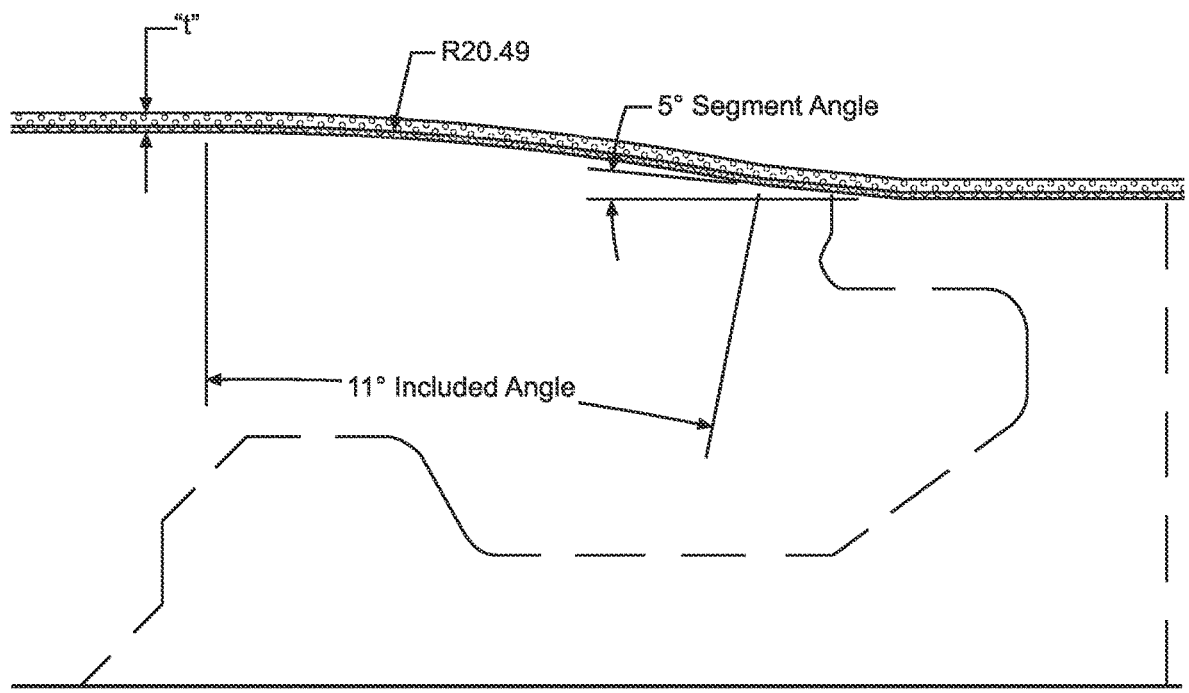
FIG. 8 is a cross section of another exemplary embodiment of a decorative article, including certain exemplary bevel angles and the location and shape of an exemplary connector portion in the base material.

Further still, in other embodiments, such as those shown in FIGS. 7 and 8, the sloped edges/bevel profile may be a combination of a rounded portion and an angled line segment, wherein the angled line segment extends from the lower edge of the rounded arc portion of the bevel profile. For example, the bevel profiles of the planks shown in FIGS. 7 and 8 have both a rounded portion and an angled straight line segment. The total length of the bevel shown in FIG. 7 is measured at 5.00 mm. FIG. 7 also shows that 1.00 mm of the 5.00 mm total bevel length is angled straight line segment of the bevel, meaning that the other remaining 4.00 mm is the length of the rounded portion of the bevel. In some exemplary embodiments, the rounded portion comprises no less than 70% of the total length of the bevel surface. An enlarged view of this same bevel is shown in FIG. 8, and makes clear that in certain embodiments, the bevel can comprise both a rounded portion and an angled straight line segment. In such embodiments, the angled line segment helps prevent ledging effects from becoming evident in the flooring planks. In FIG. 8, the rounded bevel portion of the plank has a radius measuring 20.49 mm and an angle of included bevel radius of 11 degrees. Also in FIG. 8, the angled line segment of the beveled edge has a segment angle of 5 degrees.

Although specific measurements are listed in FIG. 1 for the illustrated bevel's width, height, and radius, these measurements are only one exemplary embodiment. All measurements can be similarly adjusted, based on the flooring plank consumer's aesthetic preferences, by modifying the angles and distances between the corresponding saw blades and/or fixed cutters used during the bevel-forming process performed consistent with the disclosed embodiments herein.

Figure 2:
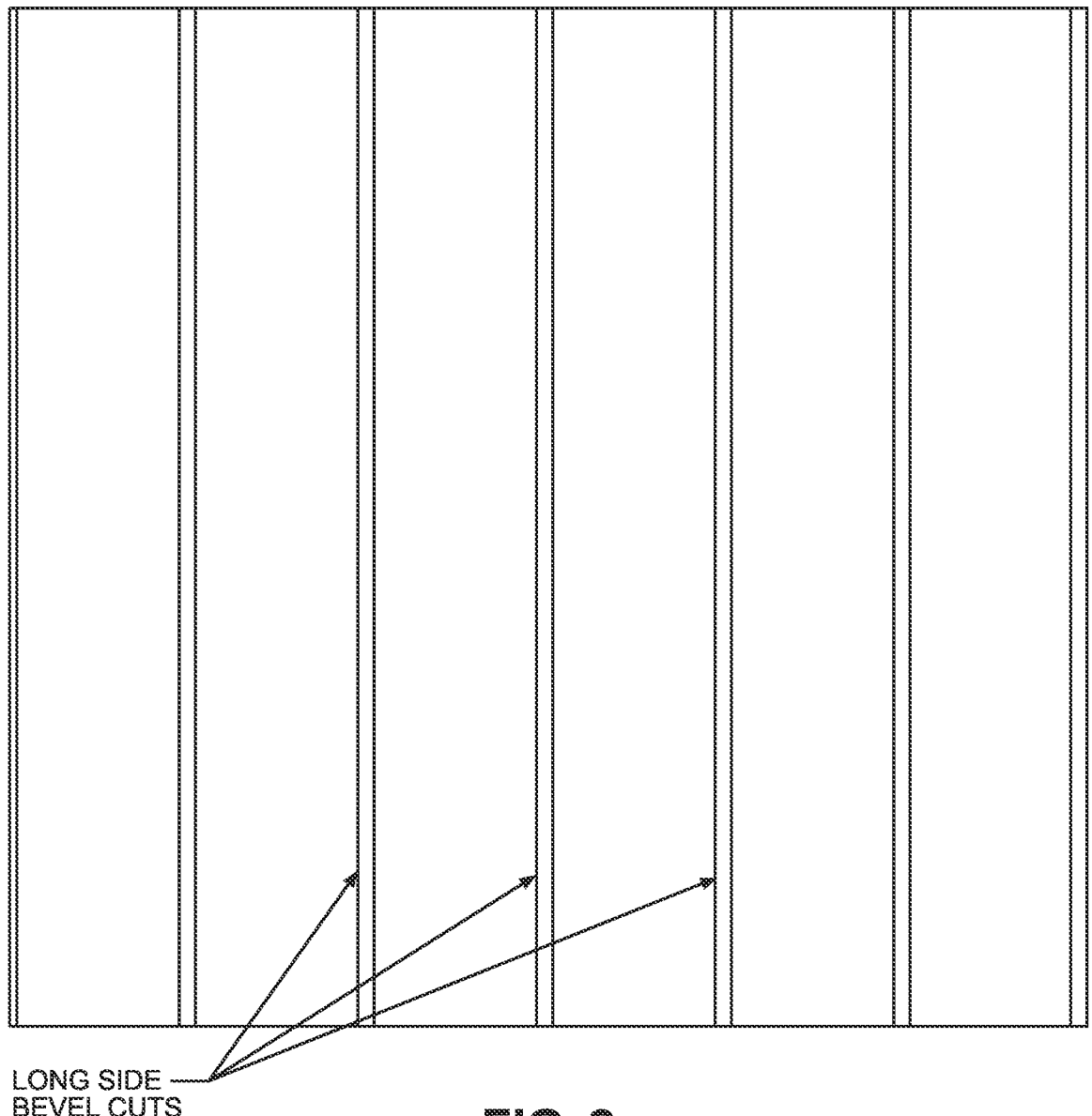
FIG. 2 is a top view of an exemplary slab of base material, including the location of certain exemplary bevel cuts along a long side of the slab.

FIG. 2 is a top view of an exemplary slab of SPC core material, including the location of certain exemplary bevel cuts along a long side of the slab.

As can be seen in FIG. 2, as the cooled slab passes under the saw blades and/or fixed cutters, a plurality of substantially parallel bevel cuts are made along the slab's long side and corresponding perimeter portion. While seven equally sized and spaced bevel cuts are contemplated in FIG. 2, the amount and size of bevel cuts and spacing between such bevel cuts may be substantially modifiable based on the aesthetic and design preferences of the floor-plank manufacturer or consumer. While each of the plurality of bevel cuts along the slab's long side are often identical, such as seen in FIG. 2, the measurements and types of bevel cuts made for each of the plurality of bevel cuts along the slab's long side do not have to be identical. For example, in certain embodiments, there may be two or more different types of bevel cuts made along the slab's long side, for example, having different shapes, curvatures, depths, or so forth. The range of depth for the bevel cut in a direction that is orthogonal to the material surface of the flooring plank (e.g., the top surface of the plank) can be anywhere from about 0.01 mm to about 2 mm. In some embodiments, a preferred range of bevel cut depth may be between about 0.1 mm and about 1.0 mm. Still, in other embodiments, one or more of the plurality of bevel cuts along the slab's long side may be unique—wherein one or more are straight-angled bevel cuts and one or more are rounded bevel cuts comprising different geometrical measurements.

Figure 3:
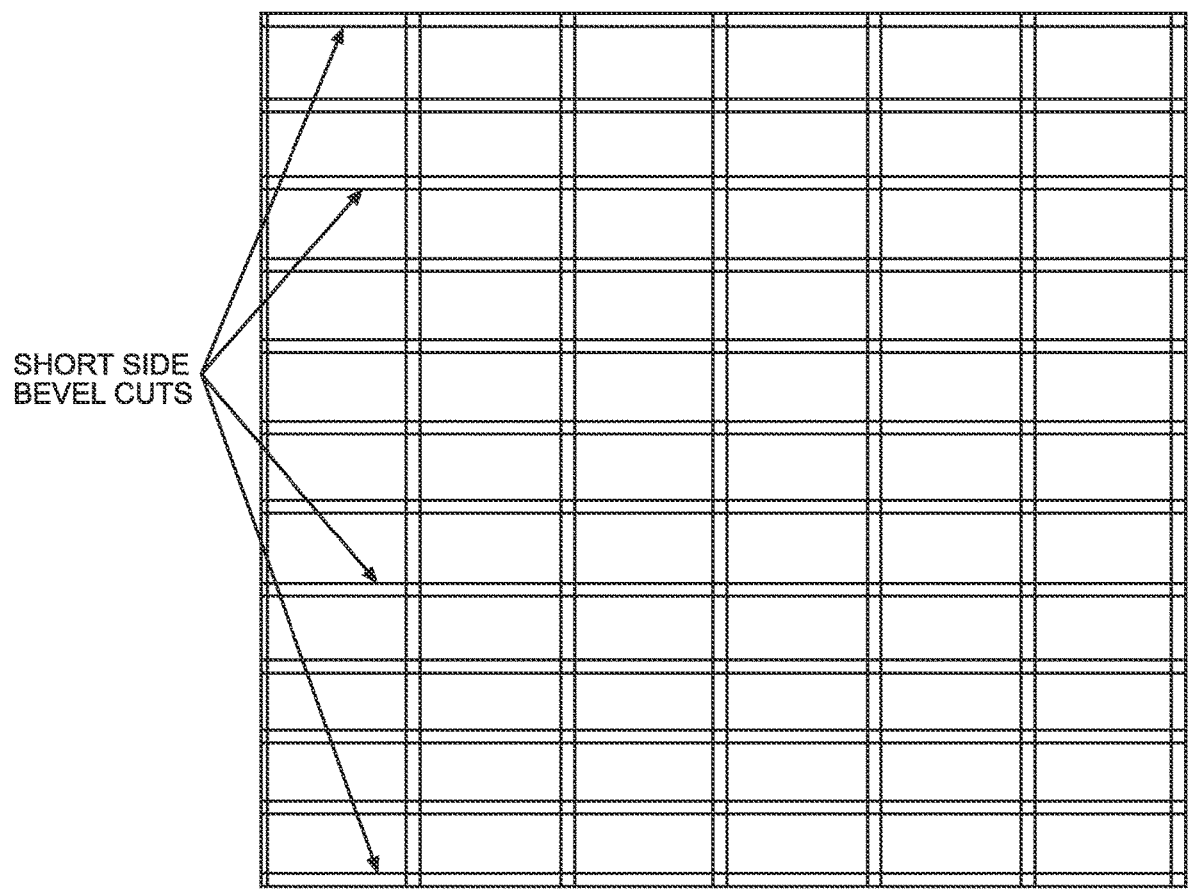
FIG. 3 is a top view of an exemplary slab of base material, including the location of certain exemplary bevel cuts along a short side of the slab.

FIG. 3 is a top view of an exemplary slab of SPC core material, including the location of certain exemplary bevel cuts along a long side of the slab.

As FIG. 3 shows, once the cooled slab has been cut along its long side and rotated 90 degrees, it then may pass under the saw blades and/or fixed cutters again to make one or more bevel cuts along the slab's short side and corresponding perimeter portion. Again, and similarly to the bevel cuts made along the slab's long side in FIG. 2, although twelve equally spaced bevel cuts are depicted in FIG. 3, the number of bevel cuts and spacing between such bevel cuts may be substantially modifiable based on the aesthetic and design preferences of the floor plank manufacture or consumer. Although each of the plurality of bevel cuts along the slab's short side may be identical, such as seen in the example shown in FIG. 3, the measurements and types of bevel cuts made for each of the plurality of bevel cuts along the slab's short side need not be identical. For example, in certain embodiments, there may be two or more different types of bevel cuts made along the slab's short side. In other embodiments, one or more of the plurality of bevel cuts along the slab's short side may be unique—wherein one or more are straight-angled bevel cuts and one or more are rounded bevel cuts comprising different measurements. Though the bevel cuts made along the slab's short side in FIG. 3 are substantially orthogonal to the bevel cuts made along the slab's long side, this may not always be the case in other alternative embodiments. In some examples, the step in FIG. 3 may be optional. That is, in said example, the flooring plank may have bevels only along the long sides and none along the short side of the flooring plank.

Further, the speed of the saw blade or other cutting head, the number of teeth thereon, and the feed rate of the core material are among some of the variables that can determine the flatness of the resulting bevel surface. By adjusting these and/or other variables, the resulting bevel surface may vary from a smooth surface to a wavier appearance. These and other variables may be adjusted to obtain the desired bevel surface appearance. It is to be understood that each of these depictions in FIGS. 2 and 3 are merely exemplary and the particular measurements of the bevel cuts disclosed herein are customizable.

Figure 4:
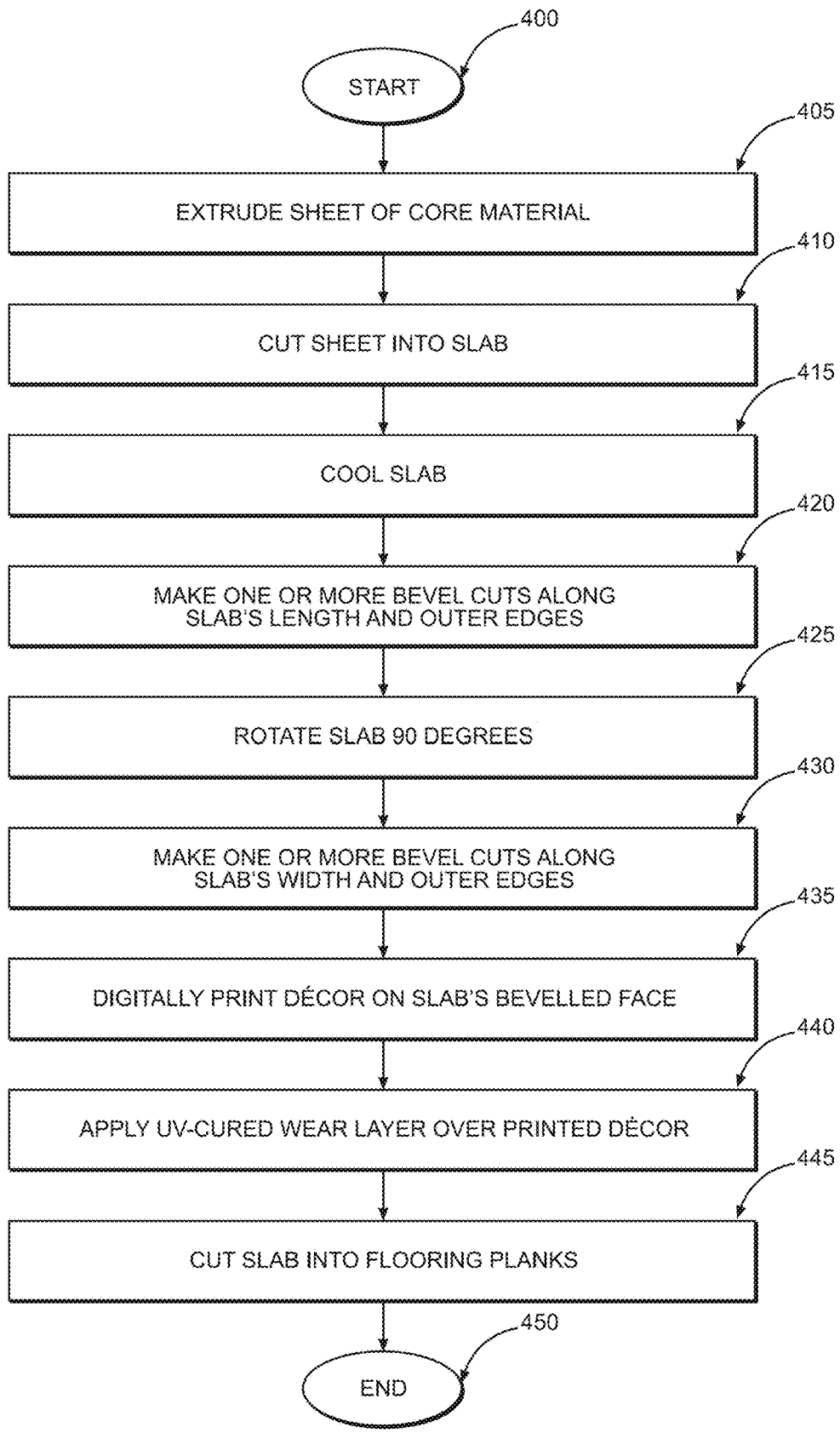
FIG. 4 is a flow chart illustrating an exemplary sequence of steps for manufacturing decorative articles having a pressed bevel effect in accordance with certain disclosed embodiments of the invention described herein.

FIG. 4 is a flow chart illustrating an exemplary sequence of steps for manufacturing SPC flooring planks having a pressed bevel effect in accordance with certain disclosed embodiments of the invention described herein.

The exemplary method for manufacturing SPC flooring planks having a pressed bevel effect starts at step 400 and generally comprises the following steps. In a first step 405, the SPC flooring plank manufacturing process may begin by extruding a sheet of SPC core material. In some embodiments, this may include continuously extruding the core material into a large sheet. The core material is heated during the extrusion process such that it is more malleable and can more easily be shaped into the shape of the sheet. In other embodiments, the core material may alternatively be formed in a mold. At step 410, the extruded sheet may be cut into a smaller piece, or slab. In some embodiments, the sheet is cut using one or more guillotine-like blades, though other sheet cutting means are contemplated. After the heated SPC core material sheet is cut into a slab, at step 415 it may be allowed to cool to a predetermined temperature, such as approximately room temperature. After the slab has sufficiently cooled, e.g., at or below the predetermined temperature, the method proceeds to step 420 where one or more pairs of rotating cutters, such as diamond saws, or fixed cutters, such as chisels or scrapers, may be run along the slab's length and corresponding outer edges to form bevels having the pressed bevel effect for adjacent SPC planks along the bevel cut lines. These cuts are generally made in one single pass along the slab's length and corresponding outer edges. In some example embodiments, before proceeding with step 420, the slab may be cooled to a temperature above room temperature (e.g., <=150F) but sufficiently below the temperature of the core material at or around step 405 and 410.

After the slab has been fed through a series of saw blades or fixed cutters that are contoured to create the desired bevel pattern in the finished planks, at step 425, the slab may be rotated 90 degrees to prepare it for another bevel-cutting pass. In some examples, step 425 may be optional. Once rotated, the slab is again run through the saw blades or fixed cutters, this time along its width direction, to form an intersecting pattern of bevels cut into its top surface at step 430. These cuts again are generally made in one single pass along the slab's width and corresponding outer edges. In some embodiments, the spacing between the saw blades or fixed cutters may be changed for cutting the bevels along the slab's width as compared to their spacing used to cut the bevels along the slab's length. In other disclosed embodiments, different sets of one or more saw blades and/or fixed cutters may be used to cut the bevels along the length and width of the slab, which also may avoid having to rotate the slab when cutting the intersecting pattern of bevels into its top surface. In yet other embodiments, where the flooring planks may not be square or rectangular shaped, there may be multiple sets of saw blades or fixed cutters, or alternatively the slab may be rotated multiple times, to have bevels cut in different directions along its top surface, thereby creating a desired pattern of bevels. Those skilled in the art will appreciate that various shapes and depths of bevels may be cut into the cooled core material consistent with the disclosed embodiments.

Further to the disclosed method, at step 435, a décor is digitally printed on the slab's top surface, including both the bevels and the substantially flat areas between the bevels. At step 440, a protective wear layer may be applied over the digitally-printed top surface of the slab. In one embodiment, this can be done by coating the top surface and the digitally-printed décor with a transparent epoxy or resin layer and then curing such a layer with UV radiation (or by electron beam curing) for a predetermined amount of time. In some embodiments, the protective wear layer or other topcoat layer may be applied by a roller over the top surface of the flooring planks. In some embodiments, the topcoat may be disposed above the wear layer. The roll coating thickness may be varied on the bevel surface that has been cut. In some embodiments, the softness of the roller can provide different levels of coating thickness that can also change the final shape of the bevel. The coating thickness along the bevel surface may be modified based on desired aesthetic preferences and, in some embodiments, by selection of the rollers. In some examples, texture may also be created by digital printing the texture (using transparent ink) or embossing in register, etching, etc. In some examples, the texture coat may also operate as a wear layer. At step 445, individual flooring planks may be cut from the digitally-printed and beveled panels, the bevels having a pressed bevel effect. In some embodiments, this step can be accomplished by using rotating blades to cut between adjacent bevel cuts in the slab's top surface. The sequence ends at step 450.

Figure 5:
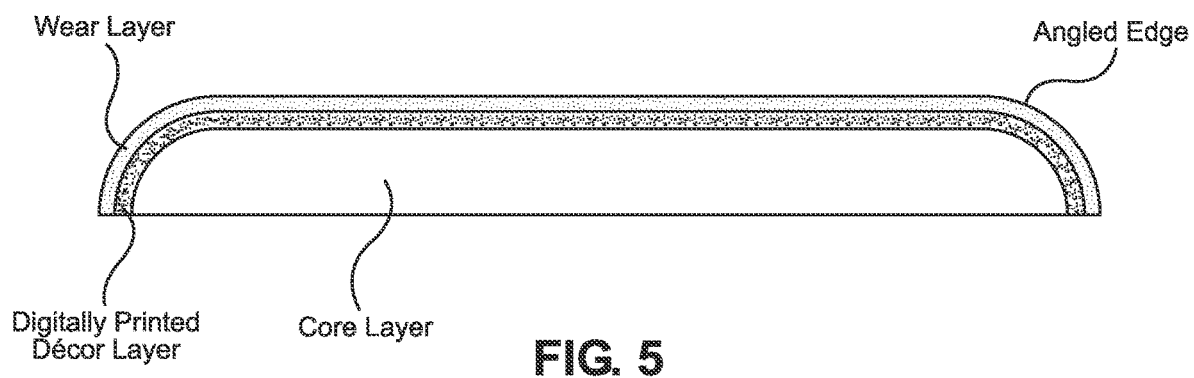
FIG. 5 is a cross section view of an exemplary embodiment of a decorative article that may be made by a method for manufacturing decorative articles having a pressed bevel effect in accordance with certain disclosed embodiments of the invention described herein.
Figure 6:
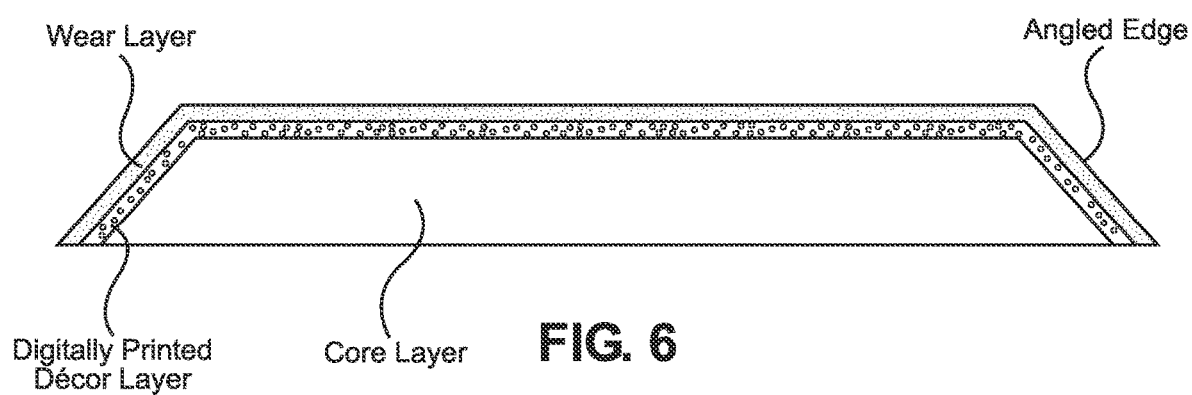
FIG. 6 is a cross section view of another exemplary embodiment of a decorative article that may be made by a method for manufacturing decorative articles having a pressed bevel effect in accordance with certain disclosed embodiments of the invention described herein.

FIG. 5 is a cross sectional side view of one exemplary embodiment of a decorative plank having rounded angled edges that may be produced by the method of manufacturing SPC flooring planks having a pressed bevel effect as described above in regard to FIG. 4. While the angled edges are rounded, they can take on a variety of shapes. For example, FIG. 6 depicts a cross sectional side view of another exemplary embodiment of a decorative plank instead having V-shape angled edges (when positioned adjacent to other planks) that may be produced using the disclosed methods of manufacturing SPC flooring planks having a pressed bevel effect. In further embodiments, the angled edges can be a combination of the two, wherein one portion of the angled edge is rounded similarly to that shown in FIG. 5. While another portion of the same angled edge may be a V-shaped straight line segment similar to that shown in FIG. 6. Each of the decorative planks shown in FIGS. 5 and 6 generally comprises a core layer, a décor layer digitally printed on the top surface of the core layer, and a wear layer on top of the digitally printed décor layer. The core layer may comprise any number of materials. In some embodiments, the core layer may comprise a rigid SPC core layer. In other embodiments, the core layer may be a rigid core comprising some combination of magnesium oxide, magnesium salt, and/or fibers (natural or synthetic). Regardless of the composition of the core layer, the décor layer will be digitally printed thereon. In further embodiments, the decorative planks may further comprise a number of different topcoats or under layers. While FIGS. 2-5 are described using an example of a flooring plank having an SPC rigid core, it is noted that the present disclosure can be used with flooring planks having rigid cores comprising other appropriate materials such as mineral core (magnesium oxide-based cores) without departing from a broader scope of the present disclosure.

In some embodiments, such as those shown in FIGS. 7 and 8, the thickness of the décor layer, the wear layer, and any other layer applied over the top surface of the rigid core of the flooring plank may remain substantially uniform along the substantially flat top surface of the decorative plank and the angled beveled edges. That is a thickness "t" of the top layers (combined or individually) such as the décor layer, wear layer, topcoat, etc., of a flooring plank may be the same at the angled edges (bevels) and the substantially flat portions between opposing angled edges. In other embodiments, based on how the décor layer, wear layer, and/or other topcoat layer(s) are applied, the thickness of these layers may not be substantially uniform along the entire cross section profile of the plank. In some embodiments, the thickness of these top layers along the angled beveled edges may be greater than their thickness along the substantially flat top surface portion of the decorative plank. In certain exemplary embodiments, the angled bevel edges formed as disclosed herein may not cause the core layer to be compressed substantially. In such embodiments, the core layer may be compressed less than 1% along its angled bevel edges. Further, in some exemplary embodiments, the slope of the angled bevel edges may remain consistent along their long directions of the edges of the planks, for example, having less than a 15% variation in slope along such long directions or short directions.

In some embodiments, such as those shown in FIGS. 7 and 8, the base (i.e., core layer) may comprise a male connector portion that extends from at lease one side surface and a female connector portion formed at the opposite side surface. In such embodiments, the female connector portion comprises a groove that is defined by an upper lip and a lower lip, and is configured to receive the corresponding male connector portion of another plank to interconnect the two planks together.

In an exemplary embodiment, the décor layer is digitally printed (e.g., using a printer) directly on the top surface of the core layer, such that all or substantially all of the exposed top surface of the core layer is covered by the décor layer and no longer visible to the naked eye. Although not shown in the exemplary embodiments of FIG. 5 or 6, certain embodiments of the disclosed decorative planks having an angled edge may further comprise an underlayer adhered to the bottom surface of the core layer. In such embodiments, the underlayer may comprise one or more of cork, rubber, foam, a paper impregnated with melamine resin, a waterproof balance paper, etc. One or more underlayers may provide a liquid barrier, a vapor barrier, a sound barrier, or some combination of each. In further embodiments, the one or more underlayers of the decorative planks may additionally comprise a cushioning layer disposed below a balancing layer.

In some example embodiments, the direct digital printing on the core may include applying a primer layer (light or solid colored like white, off-white, etc.) to the core and then digitally printing using printers on top of the primer layer that is configured to receive inks (e.g., water based or radiation curable).

The language used herein has been principally selected for readability and instructional purposes, and it may not have been selected to delineate or circumscribe the inventive subject matter. Other implementations, uses, and advantages of the invention will be apparent to those skilled in the art from consideration of the specification and practice of the invention disclosed herein. The specification should be considered exemplary only, and the scope of the invention is accordingly intended to be limited only by the following claims.

I claim:

1. A method of manufacturing angled edges on decorative articles, the method comprising:
    extruding a sheet of core material;
    cutting the sheet of core material into a slab;
    cooling the slab;
    after the slab has been cooled down to at least a predetermined temperature, wherein the predetermined temperature is less than or equal to 150 degrees Fahrenheit, cutting one or more angled edges on a top surface of the slab;
    rotating the slab;
    cutting one or more additional angled edges on the top surface of the rotated slab such that the one or more additional angled edges intersect the one or more angled edges previously cut on the top surface of the slab;
    digitally printing a décor layer on the top surface of the slab after cutting the one or more angled edges and the one or more additional angled edges on the top surface of the slab;
    applying a wear layer over the digitally printed décor layer; and
    cutting the slab into a plurality of decorative articles, where each decorative article has one or more outer edges that are angled.

2. The method of claim 1, wherein each of the angled edges are rounded edges having a bevel radius of between about 1 millimeter to about 100 millimeters.

3. The method of claim 2, wherein the bevel radius has an included angle ranging from about 2 degrees to about 90 degrees.

4. The method of claim 1, wherein each of the angled edges are rounded angled edges having a bevel radius of between about 4 millimeters to about 30 millimeters.

5. The method of claim 4, wherein the bevel radius has an included angle ranging from about 8 degrees to about 53 degrees.

6. The method of claim 1, wherein each of the angled edges are straight line angled edges forming an angle of between 0 degrees to about 45 degrees, as measured in a manner relative to a plane parallel with the top surface of the slab.

7. The method of claim 1, wherein each of the angled edges are straight line angled edges forming an angle of between 2 degrees and 20 degrees, as measured in a manner relative to a plane parallel with the top surface of the slab.

8. The method of claim 1, wherein the one or more angled edges and the one or more additional angled edges have identical cut dimensions.

9. The method of claim 1, wherein the core material comprises a stone polymer composite.

10. The method of claim 1, wherein the wear layer is applied over the digitally printed décor layer by a roller.

11. The method of claim 1, wherein the predetermined temperature is approximately room temperature.

12. The method of claim 1, wherein the step of rotating the slab further comprises rotating the slab after the one or more angled edges have been cut on the top surface of the slab, wherein the slab including the one or more angled edges is rotated prior to cutting the slab into a plurality of smaller portions.

13. The method of claim 1, wherein the step of cutting one or more additional angled edges on the top surface of the rotated slab is performed prior to cutting the slab into a plurality of smaller portions.

14. The method of claim 1, wherein the step of rotating the slab further comprises rotating the slab by 90 degrees.

15. The method of claim 1, wherein each of the plurality of decorative articles is a rectangular shaped article.

16. A method of manufacturing angled edges on decorative articles, the method comprising:
   extruding a sheet of core material;
   cutting the sheet of core material into a slab;
   cooling the slab;
   cutting one or more angled edges on a top surface of the slab prior to cutting the slab into a plurality of smaller portions;
   rotating the slab after the one or more angled edges have been cut on the top surface of the slab, wherein the slab including the one or more angled edges is rotated prior to cutting the slab into the plurality of smaller portions;
   cutting one or more additional angled edges on the top surface of the rotated slab such that the one or more additional angled edges intersect the one or more angled edges previously cut on the top surface of the slab, wherein the one or more additional angled edges are cut on the top surface of the slab prior to cutting the slab into the plurality of smaller portions;
   digitally printing a décor layer on the top surface of the slab after cutting the one or more angled edges and the one or more additional angled edges on the top surface of the slab;
   applying a wear layer over the digitally printed décor layer; and
   cutting the slab into the plurality of smaller portions, where each smaller portion corresponds to an individual decorative article, and where each decorative article has one or more outer edges that are angled.

17. The method of claim 16, wherein the step of rotating the slab further comprises rotating the slab by 90 degrees.

18. The method of claim 16, wherein each decorative article is a rectangular shaped article.

19. The method of claim 16, wherein the step of digital printing further comprises a step of creating a texture on the top surface of the slab.

* * * * *